United States Patent Office 3,475,824
Patented Nov. 4, 1969

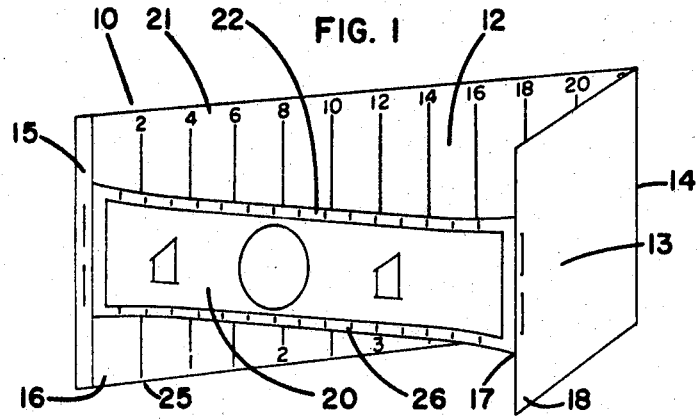
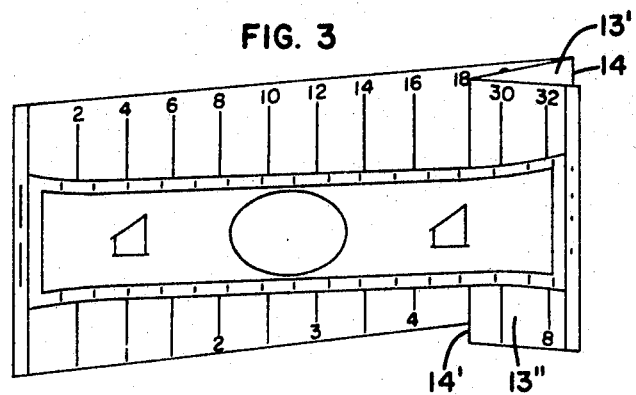
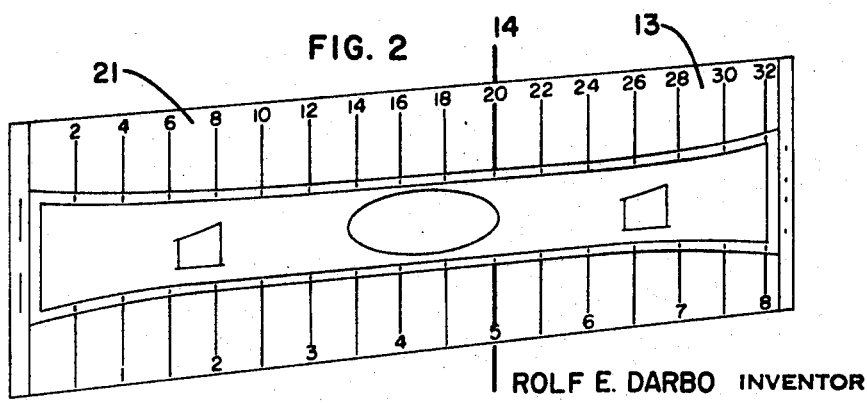

3,475,824
PROPORTIONING RULE
Rolf E. Darbo, Box 2158, Madison, Wis. 53701
Filed Apr. 24, 1967, Ser. No. 633,170
Int. Cl. G01b *3/02, 3/10*
U.S. Cl. 33—137                             3 Claims

ABSTRACT OF THE DISCLOSURE

A pocket-sized fold-open proportioning rule comprising a folding fixed scale and a juxtaposed resiliently extensible scale fixed together at the ends so that the length of the extensible scale will increase when the rule is unfolded in proportion to the incremental increase of the fixed scale to original length thereby enabling corresponding proportional quantities to be read for any value on the scales.

---

This invention relates to a proportioning rule for graphically illustrating fixed ratio quantities and more particularly relates to a pocket-sized rule free of moving parts and comprising a foldable fixed scale secured at the ends to a resiliently extensible scale and printed with indicia for visual comparison of quantities related by fixed ratios, as for example, the increase in cost of particular goods or services during a given period of time relative to an average increase in cost of goods and services as measured by a cost of living index.

Devices which comprise movable sliding or rotating scales juxtaposed adjacent fixed scales have heretofore been known, but all such devices have required the movabel scale to be positioned and read prior to reading the desired value in the fixed scale. In the invention hereinafter described the desired fixed scale value is read without preliminary reading and positioning of a scale other than by unfolding the device.

An object of this invention is to provide a direct reading instrument for indicating values related by fixed ratios and which does not require manipulation other than simple unfolding of the fixed scale.

Other objects will become apparent from the following description and from the drawings in which like numbers refer to like parts and wherein:

FIGURE 1 is a perspective view of one embodiment of this invention in partially folded position;

FIGURE 2 is a front elevation of the embodiment of FIGURE 1 in unfolded position;

FIGURE 3 is a perspective view of another embodiment of this invention in partially folded position.

Referring now to FIGURE 1, instrument 10 comprises longer back portion 12, and shorter back portion 13 foldably connected at fold line 14. In a preferred embodiment back portions 12 and 13 together comprise a unitary piece of paperboard or synthetic resin such as polypropylene or acrylonitrile-butadiene-styrene copolymer with fold line 14 being creased or molded therein. Anchor 15 is connected to the free end extremity 16 of back portion 12 and may be unitary therewith, and in the manner shown for fold line 14. Anchor 17 is similarly connected to free-end extremity 18 of back portion 13. Extensible member 20 is fixed at each end thereof by anchors 15 and 17 and consists of an elastomer of controlled composition and dimensional configuration such that upon being elongated, any selected segment of extensible member 20 will be incrementally increased in predetermined exact relation to the total incremental elongation of member 20.

As an illustrative example, when portion 13 is folded flat upon portion 12, let the segment of scale 21 disposed on back portions 12 and 13 intermediate the points of connection of extensible member 20 with anchors 15 and 17 be printed with a uniform linear scale having markings numbering from 0 to 100, and let scale 22 on extensible member 20 be identically printed with markings numbering from 0 to 100 in exact correspondence to scale 21 markings, and further let scale 21 markings be continued in the same manner along the remaining length of back portion 12 and the length of back portion 13 so that the marking corresponding to the position of the connection of extensible member 20 and anchor 17 when portion 13 is unfolded flat with portion 12 is the number "228," then let it be assumed that such markings "100" and "228" on scale 21 are proportional to the national cost of living index in the years 1937 and 1966, respectively, so that upon unfolding portion 13 flat with portion 12, one can immediately read on scale 22 the corresponding 1966 value of some particular fraction of a 1937 dollar. If, adjacent selected values on scale 22 are printed legends of costs of certain goods or services in the year 1937 and adjacent scale 21 are printed legends of costs of the same goods or services in the year 1966, then the comparative increase in the costs of such goods or services during those years to the increase in the cost of living index during the same period of time is graphically illustrated.

It will be apparent that similar scales 25 and 26 may be placed along the lower edges of back portions 12 and 13 and extensible member 20 and further that by providing slots in the extensible member 20 and markings, further scales may be provided.

Extensible member 20 may be any suitable elastomer such as natural rubber, synthetic rubber or elastomeric synthetic resin. It may be printed with legend and with appropriate illustration, e.g. simulation of the design on the face of one dollar paper currency.

Tab-like anchors 15 and 17 as shown in FIGURE 1 may comprise other suitable means such as embedment of the ends of extensible member 20 in back portions 12 and 13. Back portions 12 and 13 are sufficiently rigid except at the fold line 14 to prevent the tension exerted by member 20 when fully elongated from bending back members 12 and 13 appreciably.

Rule 10 is shown in fully extended position in FIGURE 2.

In FIGURE 3 another embodiment of this invention is shown wherein back portions 13' and 13" are provided in place of back portion 13 of FIGURE 1. Fold-line 14' at the connection of back portions 13' and 13" enables the back portions to be folded to provide an addition position for juxtaposed indicia on scales 21 and 22 and thereby to provide for values corresponding to a different proportional relation or ratio between juxtaposed indicia on scale 22 and scale 21 to be shown; thus, by folding back portion 13' flat upon back portion 12 and additionally folding back portion 13" flat upon back portion 13' values can be read from juxtaposed indicia on scales 21 and 22 which correspond to a ratio between indicia on the two scales which is different from and additional to the ratio shown when back portions 13' and 13" are fully extended from back portion 12. A further proportional relation between juxtaposed indicia may be provided by unfolding back portion 13' from back portion 12 and folding back portion 13" flat upon back portion 13'. It will be apparent that additional fold lines similar to fold lines 14 and 14' may be provided to provide as many additional ratios of values between scales 21 and 22 as may be desired.

It is also within the scope of this invention to provide folding extensions at both ends of a back member; thus folding back portions similar to members 13 in FIGURE 1 or members 13' and 13" in FIGURE 3 may be provided at either or both ends of back member 12 in embodiments of this invention with extensible member 20 being secured to the extremities of the folding members only. Scale indicia can be arranged in such embodiments to enable indicia of decreased value related by fixed ratios to be shown in a manner similar to that herein described for indicia of increased value.

I claim:
1. A calibrated fixed ratio proportioning scale comprising in combination a rigid fixed back member having at least one calibrated scale thereon, at least one rigid back member extension foldably connected to said fixed back member wherein the two rigid members normally assume positions such that they include an angle of either 0° or 180°, and at least one resiliently extensible member, said scale on said fixed back member comprising indicia increasing in value along a length of said back member from a base value to a greater value at said foldable connection with said back member extension, said back member extension bearing scale indicia along a length thereof calibrated as a continuation of said scale on said fixed back member, the length of said scale on said back member extension being related in fixed proportion to the length of said scale on said back portion, said extensible member being fixedly attached at one end extremity thereof to said back member adjacent said scale indicia base value and at the opposite end extremity thereof to said back member extension adjacent the upper limit of said scale indicia value, said extensible member bearing scale indicia corresponding substantially identically in value and disposition to scale indicia on said back member when said back member extension is folded flat onto said back member, said extensible member being substantially uniformly elongated by said back member extension being unfolded from said back member, values of a ratio fixed by the relative length of said extensible member scale when contracted to that when extended being readable from said scale on said extensible member when said extensible member is extended into juxtaposition with said scales on said back member and back member extension.

2. The article of claim 1 wherein said back member extension is provided with at least one foldable connection therein substantially parallel to the foldable connection between said back member and said back member extension.

3. A foldable rule for determining values related by fixed equation comprising in combination at least two substantially rigid members, a foldable connection between said two members wherein they normally assume positions such that the included angle is either 0° or 180°, a resiliently extensible member fixed substantially adjacent the free extremities of each of said two rigid members, said rigid members and said extensible member bearing scale indicia from which values can be read from juxtaposed scales when said rule is folded and when said rule is unfolded to determine unknown quantities related by fixed equation to values on one said scale.

References Cited

UNITED STATES PATENTS 2,561,020 7/1951 Gerbet.
2,190,472 2/1940 Ferrughell.

FOREIGN PATENTS 99,110 1924 Austria.

LEONARD FORMAN, Primary Examiner

S. L. STEPHAN, Assistant Examiner

U.S. Cl. X.R.

35—30